(12) United States Patent
Pohjola et al.

(10) Patent No.: US 7,978,976 B2
(45) Date of Patent: Jul. 12, 2011

(54) OPTICAL DATA TRANSMISSION SYSTEM

(75) Inventors: Olli-Pekka Pohjola, Helsinki (FI); Ari Tervonen, Helsinki (FI); Harri T. Jarvinen, Vantaa (FI); Markku Oksanen, Helsinki (FI)

(73) Assignee: Schofield Technologies LLC, Wilmington, DE (US)

( * ) Notice: Subject to any disclaimer, the term of this patent is extended or adjusted under 35 U.S.C. 154(b) by 1357 days.

(21) Appl. No.: 10/622,113

(22) Filed: Jul. 18, 2003

(65) Prior Publication Data

US 2004/0234195 A1 Nov. 25, 2004

(30) Foreign Application Priority Data

May 20, 2003 (GB) .................................. 0311563.1

(51) Int. Cl.
*H04J 14/00* (2006.01)
(52) U.S. Cl. ................ 398/72; 398/66; 398/67; 398/68; 398/70; 398/71; 398/58; 398/63; 398/92
(58) Field of Classification Search .................... 385/24, 385/135; 398/72, 82, 187, 70, 78, 79, 19, 398/34, 91; 359/124, 121, 125, 280, 180, 359/174, 163, 130, 145; 370/355, 280, 352
See application file for complete search history.

(56) References Cited

U.S. PATENT DOCUMENTS

| | | | |
|---|---|---|---|
| 5,559,624 A * | 9/1996 | Darcie et al. ..................... 398/72 |
| 5,694,234 A * | 12/1997 | Darcie et al. ..................... 398/72 |
| 5,706,111 A * | 1/1998 | Morales et al. .................. 398/72 |
| 5,940,207 A * | 8/1999 | Weich et al. ..................... 359/333 |
| 5,953,142 A * | 9/1999 | Chiaroni et al. ................... 398/82 |
| 6,240,118 B1 * | 5/2001 | Doerr et al. ...................... 372/64 |
| 6,434,175 B1 * | 8/2002 | Zah .................................. 372/20 |
| 6,449,074 B1 * | 9/2002 | Okano et al. ..................... 398/91 |
| 6,456,407 B1 | 9/2002 | Tammela et al. |
| 6,619,865 B1 * | 9/2003 | Takai et al. ...................... 398/68 |
| 6,868,234 B1 | 3/2005 | Tammela et al. |
| 6,870,836 B1 * | 3/2005 | Dyke et al. ...................... 370/355 |
| 2001/0004290 A1 * | 6/2001 | Lee et al. ......................... 359/124 |
| 2002/0196491 A1 * | 12/2002 | Deng et al. ....................... 359/124 |
| 2003/0142978 A1 * | 7/2003 | Lee et al. .......................... 398/34 |
| 2003/0231382 A1 * | 12/2003 | Ahn et al. ........................ 359/344 |
| 2004/0067059 A1 * | 4/2004 | Song et al. ........................ 398/82 |
| 2004/0234265 A1 * | 11/2004 | Shin et al. ........................ 398/79 |
| 2004/0252738 A1 * | 12/2004 | Hill .................................. 372/43 |
| 2005/0163503 A1 * | 7/2005 | Lee et al. .......................... 398/19 |

OTHER PUBLICATIONS

Chan et al: Upstream traffic transmitter using injection-locked Fabry-Perot laser diode as modulator for WDM access networks, Electronics Letters, Jan. 3, 2002, vol. 38, No. 1, p. 43-45.*

Kim et al : A low-cost WDM source with an ASE injected Fabry-Perot semiconductor laser, IEEE Photonics Technology Letters, vol. 12, No. 8, Aug. 2000, p. 1067-1069.*

Park et al : DWDM-Based FTTC access network, Journal of Lightwave Technology, vol. 19, No. 12, Dec. 2001, p. 1851-1855.*

(Continued)

*Primary Examiner* — Li Liu

(57) ABSTRACT

An optical data transmission system having a hub, an optical router, and a plurality of optically pumped sources at a curb location, and a plurality of optical network units (ONUs). The ONUs generate and transmit respective data modulated pumping light to the curb location where it is received by the optically pumped sources, which convert it into the wavelength channels having predefined wavelength ranges assigned to respective ONUs. The optical router routes the wavelength channels for transmission to the hub.

31 Claims, 6 Drawing Sheets

OTHER PUBLICATIONS

Healey et al : Spectral slicing WDM-PON using wavelength-seeded reflective SOAs, Electronic Letters, Sep. 13, 2001, vol. 37, No. 19, p. 1181-1182.*

Kim et al: "A Low-Cost WDM Source with ASE Injected Fabry-Perot Semiconductor Laser", IEEE Photonics Technology Letters, vol. 12, No. 8, Aug. 2000, p. 1067-1069.*

Obermann et al: "Performance Analysis of Wavelength Converts Based on Cross-Gain Modulation in Semiconductor-Optical Amplifiers", Journal of Lightwave Technology, vol. 16, No. 1, Jan. 1998, pp. 78-85.*

Chan et al: "Upstream traffic transmitter using injection-locked Fabry-Perot laser diode as modulator for WDM access networks", Electronics Letters, Jan. 3, 2002, vol. 38, No. 1, p. 43-45.*

Lee: "Passive Optical Networks for FTTx Applications", OFC 2005, Mar. 2005, OWP3.*

Stubkjaer: "Semiconductor Optical Amplifier-Based All-Optical Gates for High-Speed Optical Processing", IEEE Journal on Selected Topics in Quantum Electronics, vol. 6, No. 6, Nov./Dec. 2000, pp. 1428-1435.*

Keating et al: "High temperature, optically pumpled, 1.55 mm VCSEL operating at 6 Gb/s", 57th Annual Device Research Conference Digest, Jun. 28-30, 1999, pp. 196-197.*

Keating et al., "High-Temperature Optically Pumped 1.55-μm VCSEL Operating at 6 Gb/s," IEEE Photonics Technology Letters, vol. 12, issue 2, Feb. 2000, pp. 116-118.

Zirngibl, Martin, "Multifrequency Lasers and Applications in WDM Networks," IEEE Communications Magazine, vol. 36, issue 12, Dec. 1998, pp. 39-41.

Moller, et al., "Multifrequency Laser Based on Integrated Vernier-Michelson Cavity for Mode Stabilisation," Electronics Letters, vol. 36, issue 6, Mar. 16, 2000, pp. 540-542.

* cited by examiner

OPTICAL DATA TRANSMISSION SYSTEM

BACKGROUND OF THE INVENTION

1. Field of the Invention

The invention relates to an optical data transmission system. It is particularly, but not exclusively, related to a system comprising a passive optical fibre network.

2. Description of Related Art

In order to provide broadband telecommunications, optical transmission systems have been developed. Typically such systems transmit optical signals along optical fibre in the wavelength range of 1300 to 1600 nm. In order to provide multiple access for a plurality of users, it has been proposed for optical transmission systems to use wavelength division multiple access (WDMA).

An optical transmission system 110 is shown in FIG. 1. The system 110 comprises a central office (CO) or hub 112 connected to groups of user devices or optical network units (ONUs) 114. In this embodiment only one group 116 is shown although it will be understood that there would be a plurality of such groups. The hub 112 is connected by a common optical fibre 118 to a wavelength division multiplexer (WDM) 120. The user devices 114 are connected separately to the WDM 120 by respective optical fibres 122. The WDM 120 is said to be at a kerb location.

A downstream direction is defined from the hub 112 to the user devices 114 and an upstream direction is defined from the user devices 114 to the hub 112. Data traffic is transmitted both upstream and downstream to and from the user devices 114. The data traffic is in the form of modulated light as will be explained in the following.

Communication in the system occurs across a wavelength range, typically 1530 to 1565 nm. Each user device is assigned a wavelength band, typically spaced by 0.8 nm, with which to communicate. The hub 112 is equipped with individual laser sources producing light at different wavelengths suitable for different user devices. In the downstream direction, the hub 112 forms data traffic by modulating data onto appropriate light wavelengths which are then transmitted down the common optical fibre 118 to the WDM 120. The WDM 120 separates the data traffic according to wavelength and then directs it to particular user devices 114.

SUMMARY OF THE INVENTION

For generation and transmission of data in the upstream direction, it is impractical to provide every user device 114 with a laser source operating within its assigned wavelength band. Therefore, two arrangements have been proposed. In the first arrangement, spectral slicing is used, in which each user device 114 has a broadband light source, from which a specific optical wavelength band is sliced to form a wavelength channel which is then used in the system. Data traffic is formed by modulating data onto each wavelength channel either by switching the broadband light source on and off or by using an external modulator. In the second arrangement, a laser at the hub 112 transmits continuous wave (CW) light at appropriate wavelengths for each of the user devices 114 to use as a wavelength channel. Modulators located at the user devices 114 form data traffic by modulating data onto this CW light and sending it to the WDM 120 by the respective optical fibres 122. Different wavelength channels from different user devices 114 are multiplexed together by the WDM 120 and transmitted together on the common optical fibre 118 to the hub 112. Such a system is disclosed in IEEE Photonics Technology Letters, November 1994, volume 6, number 11, pages 1365 to 1367.

According to a first aspect of the invention there is provided a method of transmitting data in an optical data transmission system, the optical data transmission system comprising a hub, a kerb location, a converter, an optical router, and a plurality of ONUs, the method comprising the steps of:

the ONUs transmitting respective data signal to the kerb location; and the optical router routing wavelength channels having predefined wavelength ranges assigned to respective ONUs for transmission to the hub, converter converting the data signals into the wavelength channels.

According to a second aspect of the invention there is provided an optical data transmission system, the optical data transmission system comprising a hub, a kerb location, a converter, an optical router, and a plurality of ONUs, the ONUs being capable of transmitting respective data signals to the kerb location, the optical router being capable of routing wavelength channels having predefined wavelength ranges assigned to respective ONUs for transmission to the hub, and the converter being capable of converting the data signals into the wavelength channels.

According to a third aspect of the invention there is provided an optical router for an optical data transmission system, the optical data transmission system comprising a hub, a kerb location and a plurality of ONUs, the ONUs being capable of transmitting respective data signals to the kerb location, the optical router being capable of routing wavelength channels having predefined wavelength ranges assigned to respective ONUs for transmission to the hub, and the optical router comprising a converter to convert the data signals into the wavelength channels.

According to a fourth aspect of the invention there is provided a converter for an optical data transmission system, the optical data transmission system comprising a hub, a kerb location, an optical router, the converter, and a plurality of ONUs, the ONUs being capable of transmitting respective data signals to the kerb location, the converter being capable of converting the data signals into wavelength channels having predefined wavelength ranges assigned to respective ONUs, and the optical router being capable of routing the wavelength channels for transmission to the hub.

Preferably, the converter is at a kerb location. Preferably, the optical router is at a kerb location. Preferably, the converter and the optical router comprise a combined conversion and routing unit.

Preferably the optical router routes data in a downstream direction from the hub.

Preferably, a hub-side of the optical router comprises at least one input for receiving the plurality of channels and at least one output for outputting the plurality of channels. Preferably, the at least one input and the at least one output are combined as at least one bi-directional input/output. Alternatively, the at least one input and the at least one output are separate.

Preferably, an ONU-side of the optical router comprises a plurality of inputs for receiving the plurality of channels and a plurality of outputs for outputting the plurality of channels. There may be one input and/or one output for each channel. The pluralities of inputs and outputs may be combined as a plurality of bi-directional inputs/outputs.

Preferably, the optical router is a WDM. It may be an arrayed waveguide grating (AWG).

Preferably, the data signals for at least some of the plurality of ONUs are converted into the wavelength channels at a common location. Preferably, the data signals for all the ONUs are converted into the wavelength channels at the common location. Preferably, the common location is the kerb location. However, in one embodiment of the invention, conversion and routing occur at different locations at the kerb.

Preferably, the data signals are optical signals. Preferably, the data signals are used as pump signals to generate the wavelength channels. Preferably, all of the data signals have a common wavelength or are within a specified wavelength range. Preferably, at least one of the data signals has a different wavelength to the wavelength channels, or is within a wavelength range which does not include the wavelength channels.

The data signals may not have defined and controlled wavelengths in the same sense as the selected wavelength ranges used in a WDMA system. The wavelengths may be arbitrary for different ONUs within a broad range thus allowing a degree of wavelength drift of any particular ONU.

Preferably, the wavelength channels are generated by a plurality of optically pumped sources. The optically pumped sources may generate light having different wavelengths in order to define the wavelength channels having predefined distinct wavelength ranges. However, the wavelength channels having predefined distinct wavelength ranges may be generated by pumping light having the common wavelength or being within the specified wavelength range. The optically pumped sources may comprise a gain cavity, for example a laser cavity, mirrors defining the cavity, and wavelength selective elements inside the cavity. In one embodiment of the invention, the optically pumped sources do not necessarily include a filter needed for injection.

In an embodiment in which all of the data signals have a common wavelength or are within the specified wavelength range, this means that all of the ONUs may be identical. As mentioned above, this does not require that the ONUs provide light having a common wavelength, but rather that ONUs only need similar components to provide undefined wavelengths within the specified wavelength range. The ONUs are similar in the sense that no wavelength selection of source components is needed. Accordingly, this simplifies the assembly of the system since it is not necessary to provide certain ONUs to certain users. In addition, the cost of providing a plurality of identical ONUs is cheaper than the cost of providing different wavelength specific ONUs.

Preferably multimode fibre can be used between the ONUs and the kerb, between the kerb and the hub, or between both, to relieve connector quality requirements.

Preferably, the data signals carry data and are used to modulate the wavelength channels so that the data from a data signal is transferred (modulated) onto its corresponding wavelength channel.

In one embodiment the optically pumped sources each comprise a laser cavity with a predefined lasing wavelength. In this embodiment, the wavelength may be selected by the cavity. Alternatively, the wavelength may be selected by a WDM and/or a AWG. In both of these alternatives, there is no injection. In another embodiment the optically pumped sources each comprise a laser cavity without a predefined lasing wavelength. In this embodiment, the injection wavelength may be selected by a WDM and/or a AWG.

Preferably, the optically pumped sources are injection locked lasers. In another embodiment, the optically pumped sources are external cavity lasers. In this embodiment, the optical router may be within the laser cavity of at least one optically pumped source. Preferably, the optical router is within the laser cavity of a plurality of optically pumped sources.

Preferably, the optically pumped sources receive injection light and pumping light. Preferably, the pumping light is at a wavelength different to the wavelength of light which is used to carry data traffic in upstream and downstream directions. In one embodiment, the wavelength of light which is used to carry data traffic in upstream and downstream directions have identical wavelengths and are identical to or substantially the same as the injection light.

Preferably, the cavity lases at the closest longitudinal mode which corresponds to the wavelength of the injection light. If a wavelength division multiplexer or an arrayed waveguide grating is used to demultiplex the injection light for the optically pumped sources, the lasing wavelength is at the closest longitudinal mode which corresponds to the pass band for the corresponding ONU.

It is to be understood that in one embodiment, an optical network unit is the location or functional unit or hardware (or any combination of these) at which conversion is made between data in optical and in electrical forms. In this way, it can represent the end of a passive optical network. Alternatively, the ONU may represent the transfer point to another optical network, for example an optical local area network (LAN).

Preferably, the optical data transmission system comprises a passive optical network in the sense that there is no conversion between optical and electrical data signals between the ONUs and the hub.

Thus, a system and apparatus according to the invention are provided which allow the wavelength selective components to be in a network, or in the case of a method according to the invention, wavelength selection occurs in a network. For example, wavelength conversion and multiplexing take place in a kerbside unit.

According to another aspect of the invention, there is provided an optical data transmission system, the optical data transmission system comprising a hub, a wavelength converter at a kerb location, and a plurality of ONUs, the ONUs being capable of transmitting respective data signals to the kerb location, the wavelength converter being capable of converting each data signal to a wavelength channel having a specific wavelength, the wavelength channels being multiplexed together for transmission to hub.

Preferably, the wavelength conversion is carried out without any intermediate conversion to and/or from an electrical signal. Accordingly, in one embodiment, the data signals from ONUs are used as modulated optical pumping signals.

According to yet another aspect of the invention there is provided a splitter having a first optical path for carrying light into and out of a gain medium and a second optical path for carrying light in a downstream direction by-passing the gain medium.

Preferably the splitter has a third optical path for carrying pumping light into the optical cavity. Preferably the light carried into the gain medium along the first optical path is injection light. Preferably the light carried out of the gain medium along the first optical path is laser light. Preferably the light carried into the gain medium along the third optical path is pumping light.

Preferably the gain medium is comprised by a laser cavity.

BRIEF DESCRIPTION OF THE DRAWINGS

The invention will now be described by way of example only with reference to the accompanying drawings in which.

DETAILED DESCRIPTION OF THE PREFERRED EMBODIMENTS

Figure 1:
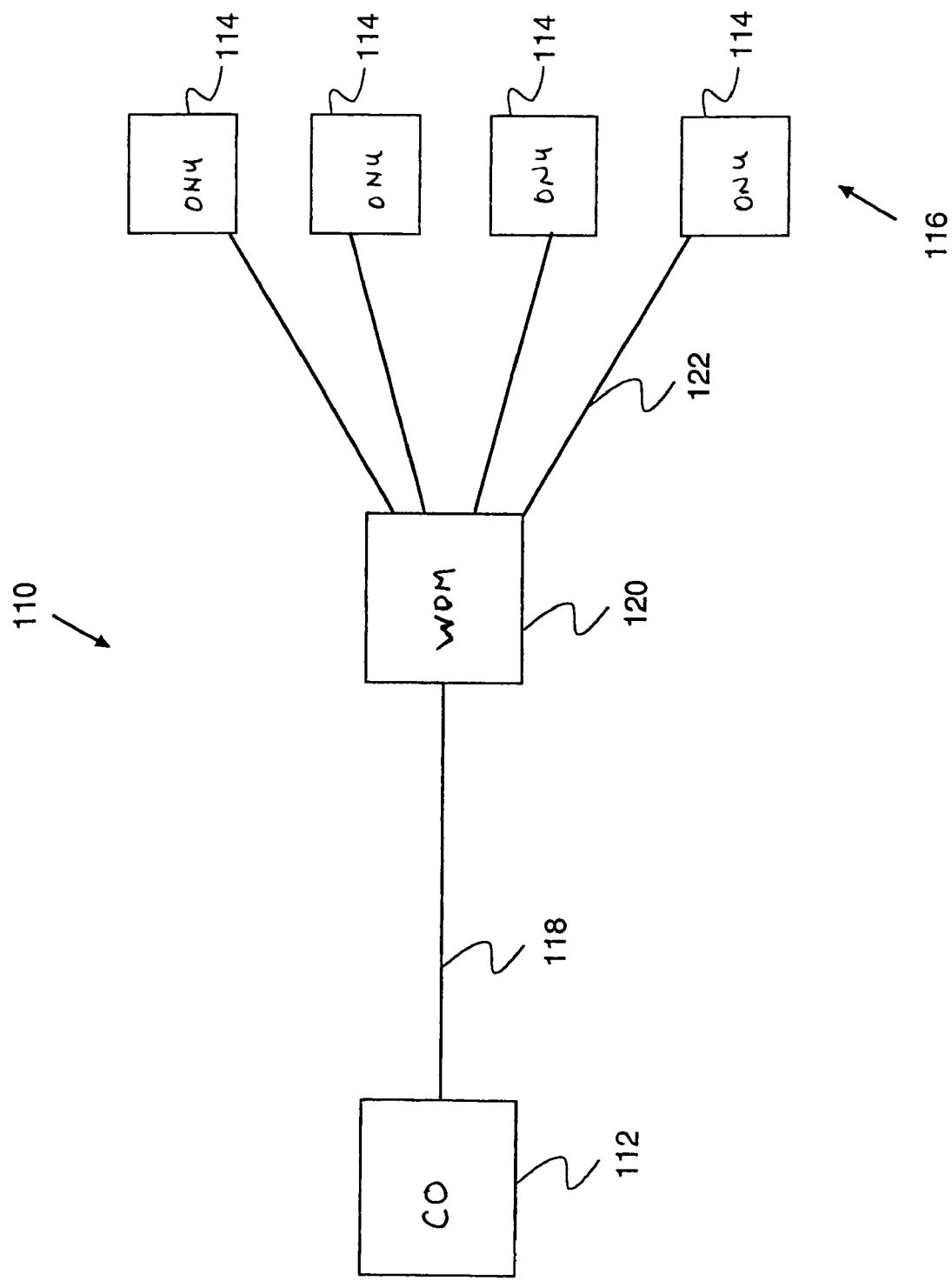
FIG. 1 shows a WDMA system according to the prior art.
Figure 2:
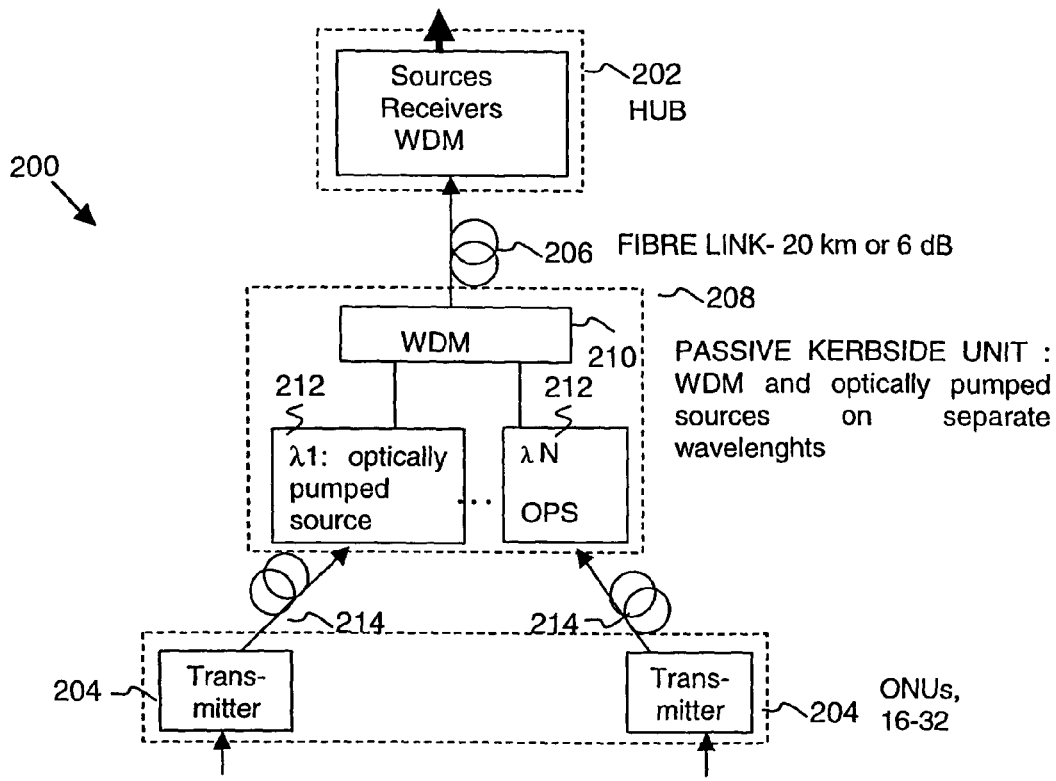
FIG. 2 shows a WDMA system according to the invention.

FIG. 2 shows a WDMA system 200. The system 200 comprises a central office (CO) or hub 202 connected to user devices or optical network units (ONUs) 204. The hub 202 is connected by an optical fibre link 206 to a kerbside unit 208. The optical fibre link is typically kilometers, or tens of kilometers, long. The kerbside unit 208 comprises a wavelength division multiplexer (WDM) 210 and a plurality of optically pumped sources 212. Each optically pumped source 212 is associated with a respective ONU 204. The ONUs 204 are connected separately to the kerbside unit 208 by respective optical fibres 214. The kerbside unit 208 is at a kerb location.

In this embodiment only two ONUs 204 are shown connected to the kerbside unit 208 although it should be understood that there would be a plurality of such ONUs, for example 16 to 32 units. Furthermore, there may also be a plurality of kerbside units 208 connected to a single hub 202.

In the following description, a downstream direction is defined from a hub to ONUs and an upstream direction is defined from the ONUs to the hub. Data traffic is transmitted both upstream and downstream to and from the ONUs. The data traffic is in the form of modulated light as will be explained in the following.

In common with all embodiments of the invention, in the system 200, communication occurs across a wavelength range, typically 1530 to 1565 nm. Of course, other wavelength ranges may be used instead. In this embodiment, each ONU is assigned a wavelength channel, typically 0.8 nm wide, with which to communicate, that is to send data traffic upstream and to receive data traffic from the hub which has been sent downstream. Which ONU receives which wavelength channel, and from which ONU a particular wavelength channel comes, is determined by the kerbside unit.

Although the upstream and downstream wavelength channels between the hub 202 and the optically pumped sources 212 can be the same for each ONU they do not necessarily have to be. In an embodiment using separate optical paths (either wholly or partially) for the upstream and downstream directions, the wavelength channels can be selected independently. However, it may be preferable to have the same wavelength channels so that they are easier to route. If partially the same fibres and/or router is used, this may dictate that the wavelength channels be the same or be different.

Generation and transmission of downstream data traffic will now be described. The hub 202 is equipped with individual laser sources producing light at wavelengths within specified wavelength channels which have been assigned to different ONUs. The hub 202 forms data traffic for a particular ONU by modulating data, to be sent to that ONU, onto light within the ONU's specified wavelength channel which is generated by one of the laser sources. The resultant data modulated light is then transmitted downstream along the optical fibre link 206 to the kerbside unit 208. The kerbside unit 208 routes the light, and thus the data traffic, according to its wavelength, to the particular ONU. In other embodiments, any suitable alternative WDM method can be used to generate the light in the specified wavelength channels at the hub. For example, the hub may use broadband sources which are spectrally sliced.

Generation and transmission of upstream data traffic will now be described. The optical pumped sources 212 of the kerbside unit 208 produces light at wavelengths within the specified wavelength channels which have been assigned to different ONUs. Each ONU 204 has a pump laser producing pumping laser light (broadband or narrowband). Each ONU 204 forms data traffic by modulating data, to be sent to the hub, onto light which is generated by the pump laser. This can be done, for example, either by switching the pump laser on and off or by using an external modulator. The resultant data modulated pumping light is then transmitted upstream along the optical fibres 214 to the kerbside unit 208. It is important to note that in a preferred embodiment of the invention, the ONUs have the same specification: for example the wavelength defined within a given 50 nm range. The ONUs do not need to be identical, they only need to be interchangeable. In this way, the ONUs can be interchanged without requiring any other modifications to the system and still permitting the system to operate.

In the kerbside unit 208 data modulated pumping light is supplied to each of the optically pumped sources 212. The optically pumped sources 212 have predefined wavelength channels, which correspond to those wavelengths of light suitably routed by the WDM 210. The data modulated pumping light is used by the optically pumped sources to form data modulated transmission light within the ONU's specified wavelength channel. The resultant data modulated transmission light is then transmitted upstream to the WDM 210 which routes the light, and thus the data traffic, according to its wavelength. Once routed, the data modulated transmission light is then transmitted upstream along the optical fibre link 206 to the hub 202.

Of course, the invention of not limited to this specific way of generating data modulated transmission light, and other methods and systems can be employed.

There are a number of other embodiments within the scope of the invention which will now be described.

Figure 3:
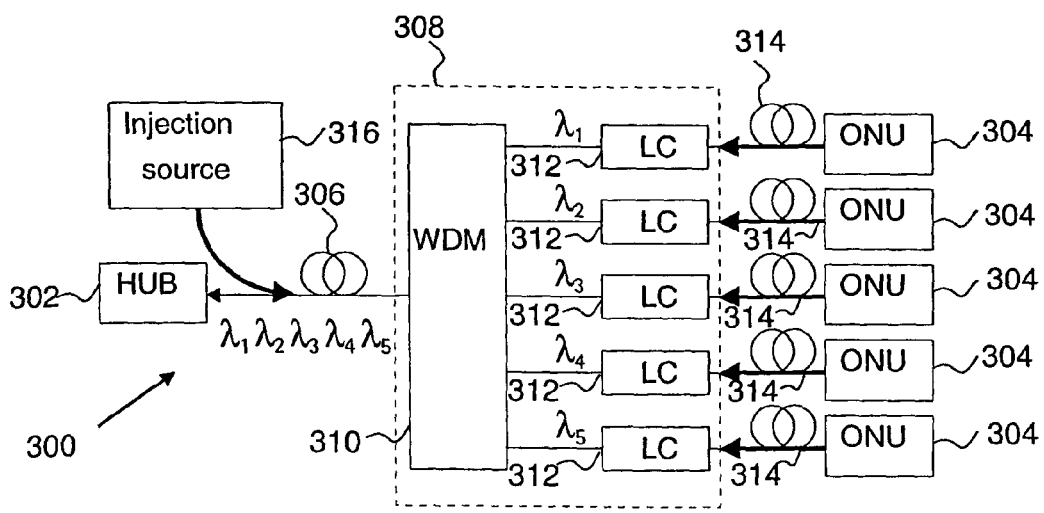
FIG. 3 shows another WDMA system according to the invention.

FIG. 3 shows an embodiment of a WDMA system 300 according to the invention. The system 300 comprises a central office (CO) or hub 302 connected to user devices or optical network units (ONUs) 304. The hub 302 is connected by an optical fibre link 306 to a kerbside unit 308. The optical fibre link is typically kilometers, or tens of kilometers, long. The kerbside unit 308 comprises a wavelength division multiplexer (WDM) 310 and a plurality of optically pumped sources 312. In this embodiment, the optically pumped sources are lasers cavities (LCs). In an embodiment in which they are Fabry-Perot laser cavities, the injection light selects the appropriate resonance peak. Each optically pumped source 312 corresponds to a respective ONU 304. The ONUs 304 are connected separately to the kerbside unit 308 by respective optical fibres 314. The kerbside unit 308 is at a kerb location.

In addition, the WDMA system 300 comprises an injection source 316. This is a broadband source producing a light within a wavelength range including the wavelengths of all of the data modulated transmission light assigned to the different ONUs. The broadband light from the injection source 316 is split by the WDM 310 and injection light having appropriate wavelengths is supplied to the LCs. The injection source may be associated with the hub 302 or the kerbside unit 308. It may be integral with either of these elements. Alternatively it may be a separate unit. It is preferred that the injection source is not in the kerb because in this way the kerb can be wholly passive and so not require a supply of electricity.

In this embodiment five ONUs 304 are shown connected to the kerbside unit 308 although it should be understood that there would be a plurality of such ONUs, for example 16 to 32 units. Furthermore, there may also be a plurality of kerbside units 308 connected to a single hub 302.

The hub 302 is equipped with individual laser sources producing light at wavelengths within specified wavelength channels which have been assigned to different ONUs. The kerbside unit 308 is equipped with individual optically pumped sources which receive pumping light coming from ONUs at wavelengths within the specified wavelength channels which have been assigned to different ONUs. Each ONU 304 has a pump laser producing pumping laser light (broadband or narrowband). The hub 302 and the kerbside unit 308 form upstream and downstream data traffic in a way which corresponds to FIG. 2. (Although it should be noted that FIG. 2 simply uses a cavity which lases at predefined wavelength whereas FIG. 3 uses injection to select the lasing wavelength). Again, it is to be noted that in a preferred embodiment of the invention, the ONUs are similar although they only have to be similar to the extent that they provide data modulated pumping light at similar wavelengths or within a specified range.

It should be noted that in this embodiment, the WDM 310 performs the functions of demultiplexing the injection light in the downstream direction and multiplexing the data modulated transmission light in the upstream direction.

Figure 4:
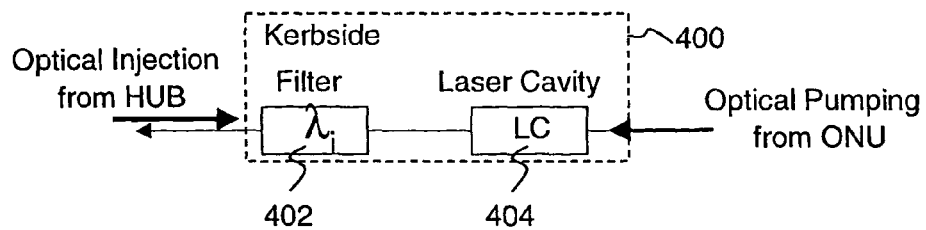
FIG. 4 shows an optically pumped source and filter according to the invention.

FIG. 4 shows a unit 400 comprising a kerbside filter 402 and a laser cavity (optically pumped source) 404. The kerbside filter 402 is not a separate element for each unit 400 but is that part of or the WDM 310 which is used by the laser cavity 404 to receive optical injection from the hub 302. It can be seen that the filtering provided by the WDM (referred to as the kerbside filter) is external to the laser cavity.

Figure 5:
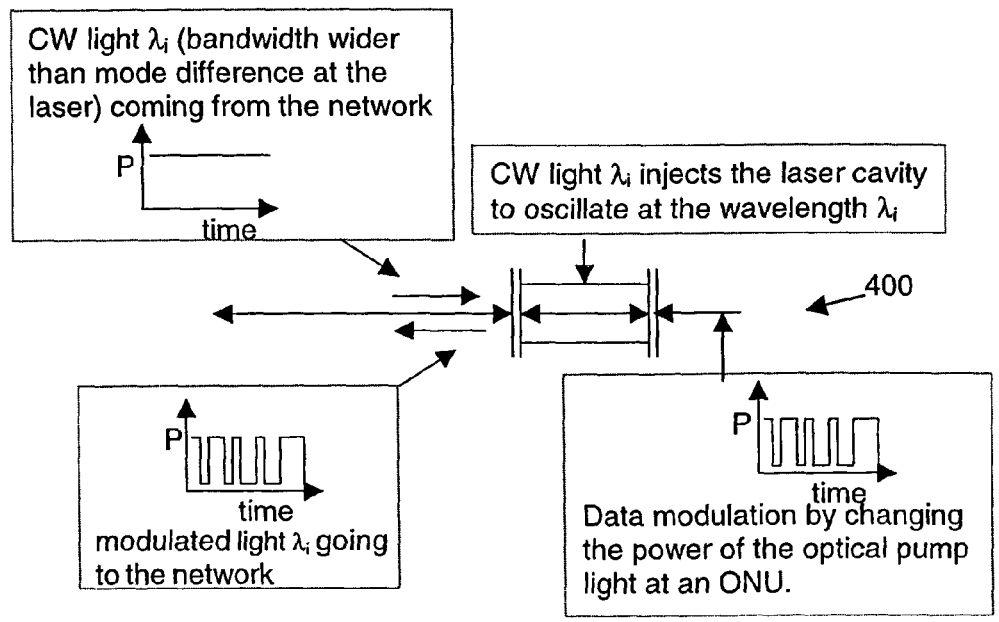
FIG. 5 shows operation of the optically pumped source and filter of FIG. 4.

FIG. 5 explains the operation of the unit 400 of FIG. 4. The laser cavity 404 receives continuous wave (CW) injection light at a wavelength $\lambda_i$ which has been filtered by the WDM 310. The laser cavity also receives data modulated pumping light from the ONU. The CW injection light at a wavelength $\lambda_i$ has a bandwidth wider than the mode difference at the laser (the wavelength $\lambda_i$ of CW injection light should coincide with one of the longitudinal modes of the laser cavity). The laser cavity 402 is injected by the CW injection light at a wavelength $\lambda_i$ and is pumped by the data modulated pumping light so that it oscillates to produce data modulated light at a wavelength $\lambda_i$ which is transmitted upstream.

Figure 6:
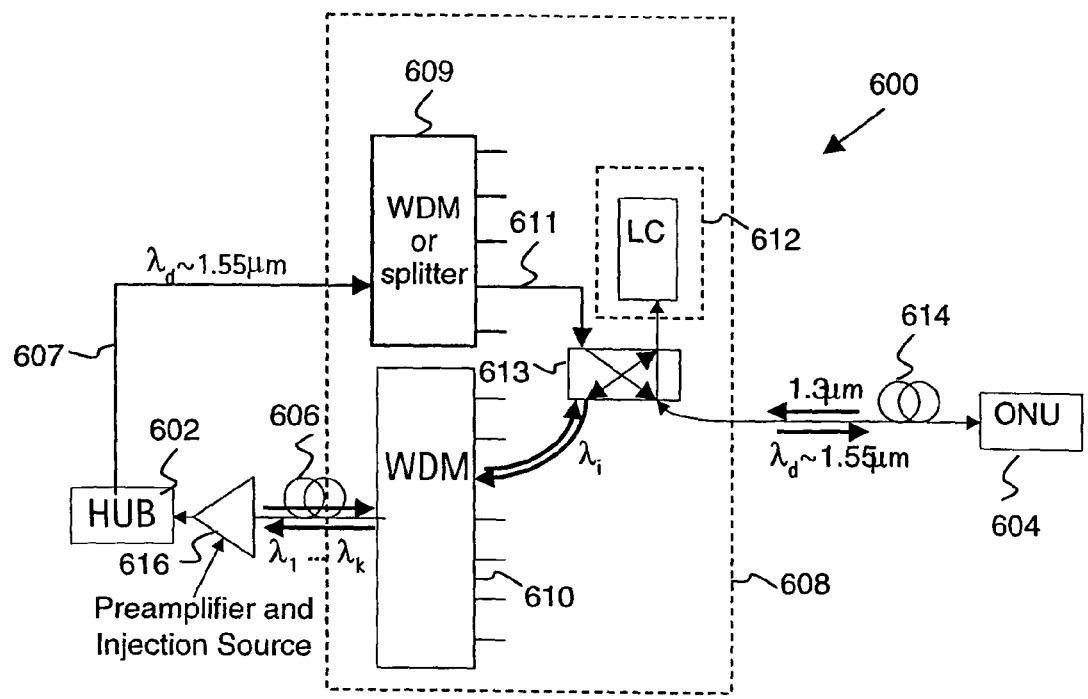
FIG. 6 shows yet another WDMA system according to the invention.

FIG. 6 shows an embodiment of a WDMA system 600 according to the invention. The system 600 comprises a central office (CO) or hub 602 connected to user devices or optical network units (ONUs) 604. The hub 602 is connected by optical fibre links 606 and 607 to a kerbside unit 608. The optical fibre links 606 and 607 are typically kilometers, or tens of kilometers, long. The kerbside unit 608 comprises an upstream wavelength division multiplexer (WDM) 610, a downstream WDM 609, and a plurality of laser cavities (LCs). Each laser cavity 612 corresponds to a respective ONU 604. The ONUs 604 are connected separately to the kerbside unit 608 by respective optical fibres 614. The kerbside unit 608 is at a kerb location. In another embodiment, a splitter can be used instead of the WDM 609.

In addition, the WDMA system 600 comprises a preamplifier and injection source 616. The preamplifier and injection source 616 acts as a broadband injection source producing a wavelength range including the wavelengths of all of the data modulated transmission light assigned to the different ONUs. The broadband light from the injection source 616 is split by the upstream WDM 610 and injection light having appropriate wavelengths is supplied to the LCs. The preamplifier and injection source 616 may be associated with the hub 602 or the kerbside unit 608. It may be integral with either of these elements. Alternatively it may be a separate unit.

In this embodiment one ONU 604 is shown connected to the kerbside unit 608 although it should be understood that there would be a plurality of such ONUs, for example 16 to 32 units. Furthermore, there would also be a plurality of kerbside units 608 connected to a single hub 602.

The hub 602 is equipped with individual laser sources producing light at wavelengths within specified wavelength channels which have been assigned to different ONUs. The LCs 612 of the kerbside unit 608 produce data modulated transmission light at wavelengths within the specified wavelength channels which have been assigned to different ONUs. Each ONU 604 has a pump laser producing pumping laser light (broadband or narrowband). The formation of upstream and downstream data traffic in the system 600 will now be described in detail.

Each laser cavity (LC) 612 is associated with an upstream/downstream WDM 613. The upstream/downstream WDM 613 is configured to provide downstream routing to the ONU by-passing the LC and upstream routing of data modulated pumping light from the ONU via the LC.

In another embodiment, rather than the hub 602 being equipped with individual laser sources producing light at wavelengths within specified wavelength channels, there is a single laser source producing light which is divided by a splitter to provide light to all WDMs 613.

Generation and transmission of downstream data traffic will now be described. The hub 602 is equipped with individual laser sources producing light at wavelengths within specified wavelength channels which have been assigned to different ONUs. The hub 602 forms data traffic for a particular ONU by modulating data, to be sent to that ONU, onto light within the ONU's specified wavelength channel which is generated by one of the laser sources. The resultant data modulated light is then transmitted downstream along the optical fibre link 607 to the kerbside unit 608. There, the data modulated light is demultiplexed in a downstream WDM 609 and sent to each LC along a fibre 611. At each LC, the downstream data modulated light is routed by the upstream/downstream WDM 613 to the ONU 604 along the optical fibre 614.

The kerbside unit 608 routes the light, and thus the data traffic, to a particular ONU according to its wavelength. In other embodiments, any suitable alternative WDM method can be used to generate the light in the specified wavelength channels at the hub. For example, the hub may use broadband sources which are spectrally sliced.

Generation and transmission of upstream data traffic will now be described. The LCs 612 of the kerbside unit 608 produce light at wavelengths within the specified wavelength channels which have been assigned to different ONUs. Each ONU 604 has a pump laser producing pumping laser light (broadband or narrowband). Each ONU 604 forms data traffic by modulating data, to be sent to the hub, onto light which is generated by the pump laser. This can be done, for example, either by switching the pump laser on and off or by using an external modulator. The resultant data modulated pumping light is then transmitted upstream along the optical fibres 614 to the kerbside unit 608. It is important to note that in a preferred embodiment of the invention, the ONUs are similar to the extent that they provide data modulated pumping light at similar wavelengths or within a specified range.

The kerbside unit 608 supplies data modulated pumping light to each of the LCs 612 via the upstream/downstream WDM 613. The upstream/downstream WDM 613 also routes the injection light from the injection source 616 (which has been split by the upstream WDM 610) to the LC 612. The LC 612 is injected by the injection light and is pumped by the data modulated pumping light so that it oscillates to produce data modulated transmission light. The data modulated transmission light emitted by the LC 612 is routed by the upstream/downstream WDM 613 to the upstream WDM 610.

Accordingly, using the upstream/downstream WDM 613 enables a single bidirectional fibre (optical fibre 614) to be used between the ONU 604 and the kerbside unit 608. In the embodiment shown in FIG. 6, the data modulated downstream signal is at 1550 nm, the injection light is at 1550 nm, the data modulated pumping light is at 1300 nm, and the data modulated transmission light is at 1550 nm. By using a 1300/1550 WDM as the upstream/downstream WDM 613, transmission of the 1550 nm light in the upstream and downstream directions is permitted and transmission of the 1300 nm light is restricted to being between the ONU 614 and the LC 612. In this embodiment, referring in the WDM 613 shown in FIG. 6, light having a wavelength of 1550 nm uses cross (diagonal) routes and light having a wavelength of 1300 nm uses a bar (vertical) route. This means that in the upsteam direction, light having a wavelength of 1300 nm travels from the ONUs to the LCs and light having a wavelength of 1550 nm travels from the LCs to the WDM 610. In the downstream direction light having a wavelength of 1550 nm travels from the WDM 609 to the ONU.

Of course, this aspect of the invention is not restricted to operation at 1300 nm and 1550 nm but may be applied to arbitrary wavelengths xnm and ynm so long as the upstream/downstream WDM permits transmission of the xnm light in the upstream and downstream directions and restricts transmission of the ynm light to being between the ONU and the optically pumped source. This is considered to be an independent aspect of the invention.

In another aspect of the invention, each LC is optically injected from upstream by using broadband light such as amplified spontaneous emission (ASE) noise from the preamplifier 616. The injecting light is split at the kerbside by the upstream WDM 610 into separate wavelengths of injecting light which are provided to each LC. The injecting light locks the laser cavity to oscillate at this injecting wavelength. The upstream WDM 610 also multiplexes the upstream traffic. The kerbside LCs and the upstream WDM 610 are thus wavelength synchronised. This is considered to be an independent aspect of the invention.

Although in this embodiment the upstream WDM 610, the downstream WDM 609, and the upstream/downstream WDM 613 are shown separately, they may be integrated together as a single unit. In one embodiment, the WDMs are based on fused couplers.

Thus, in the embodiment of FIG. 6, in the upstream and downstream directions, data traffic passes through separate routes between the optically pumped source and the hub. This principle can be applied to any of the embodiments of the invention.

Figure 7:
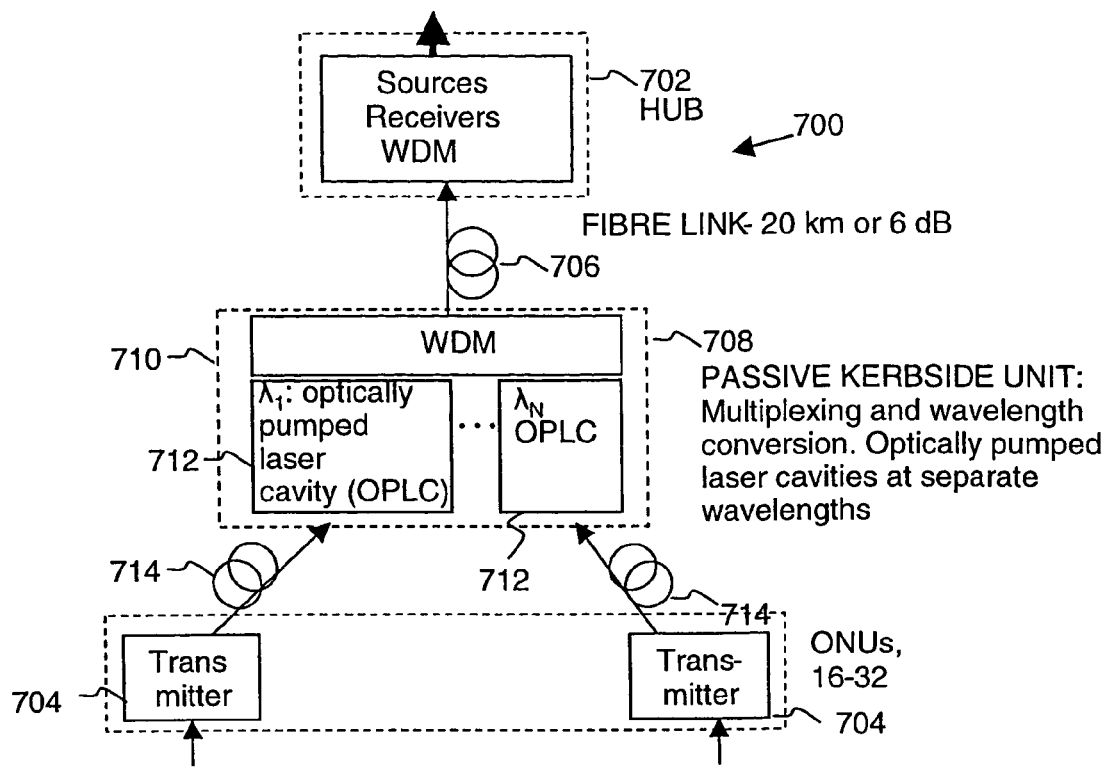
FIG. 7 shows a further WDMA system according to the invention.

FIG. 7 shows an embodiment of a WDMA system 700 according to the invention. The system 700 comprises a central office (CO) or hub 702 connected to user devices or optical network units (ONUs) 704. The hub 702 is connected by an optical fibre link 706 to a kerbside unit 708. The kerbside unit 708 comprises a wavelength division multiplexer (WDM) 710 and a plurality of optically pumped gain elements 712. Each optically pumped gain element 712 corresponds to a respective ONU 704. The ONUs 704 are connected separately to the kerbside unit 708 by respective optical fibres 714.

The system 700 is similar to the system 200 and works in a similar way. Therefore, in general, the operation of the system 700 will not be described. However, there is a difference between the system 200 and the system 700 in the arrangement of the kerbside unit 708, in particular the use of the WDM 710 and the optically pumped gain elements 712. This difference is best described with reference to FIGS. 8, 9, and 10.

Figure 8:
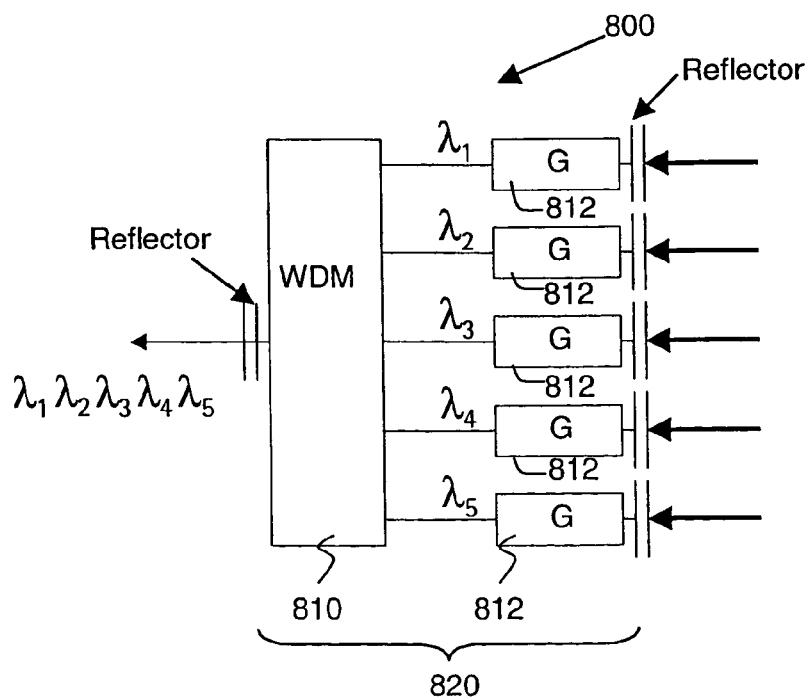
FIG. 8 shows a combined gain elements and optical router according to the invention.

FIG. 8 shows a combined gain elements and optical router arrangement 800 according to the invention. The arrangement 800 may be used as the kerbside unit 708 in the system of FIG. 7. The arrangement 800 comprises a WDM 810 and a plurality of optically pumped gain elements 812. Each optically pumped gain element 812 corresponds to a respective ONU (not shown) which is connected separately to the arrangement by a respective optical fibre (also not shown). The ONUs each have a pump laser producing pumping laser light (broadband or narrowband). All of the ONUs produce pumping laser light (data modulated pumping light) having a similar wavelength or within a specified wavelength range. The WDM 810 and the optically pumped gain elements 812 are contained within a laser cavity 820. The arrangement 800 is at a kerb location.

In the arrangement 800, no injection source is used. Instead, wavelength selection is from narrowband reflectors forming an external-cavity laser.

Figure 9:
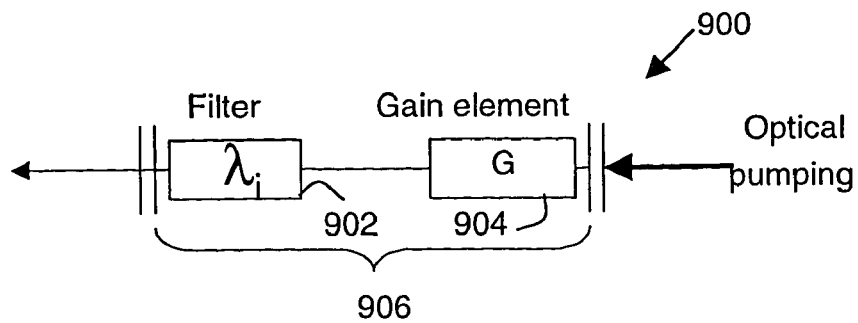
FIG. 9 shows another optically pumped source according to the invention.

Although not shown in FIG. 8, the arrangement 800 comprises a plurality of optically pumped sources 900 as shown in FIG. 9. Each optically pumped source 900 comprises a filter 902 and a gain element 904 contained within a laser cavity 906. The filter 902 is not a separate element for each optically pumped source 900 but is that part of the WDM 810 which is used to multiplex a particular wavelength signal from the optically pumped source 900 to the common optical fibre and then to a hub, such as the hub 702. It can be seen that the filtering provided by the filter 902 is contained within the laser cavity 906.

Thus, each optically pumped source 900 is pumped by the data modulated pumping light so that it emits light modulated with this data at the wavelength defined by the filter contained in the external laser cavity. The resultant data modulated transmission light is transmitted in the upstream direction.

FIG. 8 only shows generation and transmission in the upstream direction of data modulated transmission light. Of course, downstream transmission also occurs but such downstream data traffic by-passes the arrangement 800 and is not shown for the sake of clarity. It is preferred that the system 700 handles downstream data traffic in a way corresponding to that used for the system 600.

Again, it is to be noted that in a preferred embodiment of the invention, since the ONUs produce pumping laser light having a similar wavelength, they are similar to the extent that they provide data modulated pumping light at similar wavelengths or within a specified range.

Figure 10:
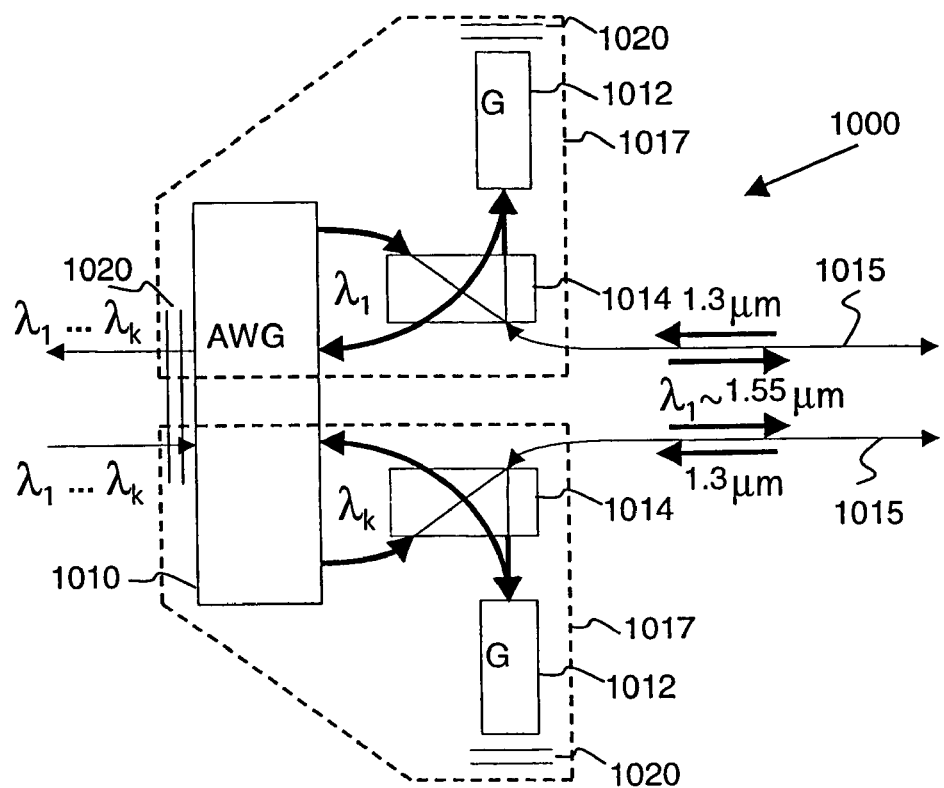
FIG. 10 shows another combined gain elements and optical router according to the invention.

FIG. 10 shows a combined gain elements and optical router arrangement 1000 according to the invention. It is an alternative to the arrangement 800 of FIG. 8 and uses the upstream/downstream WDM concept from the system 600 and the laser cavity concept from the arrangement 800. In addition, the arrangement 1000 also uses an arrayed waveguide grating (AWG) for multiplexing/demultiplexing between a number of ONUs rather than a WDM. The arrangement 1000 will now be described.

The arrangement 1000 comprises an AWG 1010, a plurality of optically pumped gain elements 1012, and a plurality of upstream/downstream WDMs 1014. Respective ones of the optically pumped gain elements 1012 and the upstream/downstream WDMs 1014 are associated with each other. Each optically pumped gain element 1012 and associated upstream/downstream WDM 1014 corresponds to a respective ONU (not shown) which is connected separately to the arrangement 1000 by a respective optical fibre 1015. The AWG 1010, the optically pumped gain elements 1012, and the upstream/downstream WDMs 1014 are contained within a laser cavity 1020 defined by mirrors at one end of the gain elements 1012 and a mirror at the hub-side of the AWG.

In the arrangement 1000, no injection source is used. Instead, wavelength selection is from narrowband reflectors forming an external-cavity laser. The arrangement 1000 also uses data modulated pumping light from the ONUs which are located downstream.

In a way which corresponds to that of FIGS. 8 and 9, the arrangement 1000 comprises a plurality of optically pumped sources 1017 each defined by a filter, one of the upstream/downstream WDMs 1014, and one of the gain elements 1012 contained within the laser cavity 1020. The filter is not a separate element for each optically pumped source 1017 but is that part of the AWG 1010 which is used to multiplex a particular wavelength signal from the optically pumped source 1017 to the common upstream optical fiber. It can be seen that the filtering provided by the filter is contained within the laser cavity 1020. The optically pumped sources 1017 produce data modulated transmission light at wavelengths within the specified wavelength channels which have been assigned to different ONUs.

Generation and transmission of downstream data traffic will now be described. The arrangement 1000 routes light at wavelengths within specified wavelength channels which have been assigned to different ONUs. This light is generated and modulated in any of the ways described in the foregoing with reference to the other embodiments of the invention. Data modulated light is transmitted downstream to, and demultiplexed by, the AWG 1010 and sent to an optically pumped source 1017. At the optically pumped source 1017, the downstream data modulated light is routed by the upstream/downstream WDM 1014 to the respective ONU.

Generation and transmission of upstream data traffic will now be described. The optical pumped sources produce light at wavelengths within the specified wavelength channels which have been assigned to different ONUs. The ONUs each have a pump laser producing pumping laser light (broadband or narrowband). Each ONU forms data traffic by modulating data, to be sent upstream, onto light which is generated by the pump laser. This can be done, for example, either by switching the pump laser on and off or by using an external modulator. The resultant data modulated pumping light is then transmitted upstream to the arrangement 1000. It is important to note that in a preferred embodiment of the invention, the ONUs are similar to the extent that they provide data modulated pumping light at substantially identical wavelengths.

The data modulated pumping light is supplied to each of the optically pumped sources 1017. In each optically pumped source 1017, the data modulated pumping light is routed by the upstream/downstream WDM 1014 to the gain element 1012. Thus, each optically pumped source 1017 is pumped by the data modulated pumping light so that it oscillates at the wavelength defined by the external cavity to produce data modulated transmission light at this wavelength. The resultant data modulated transmission light is routed by the upstream/downstream WDM 1014 in the upstream direction to the AWG 1010.

The upstream/downstream WDM 1014 is configured to provide downstream routing to the ONU by-passing the gain element 1012 and upstream routing of emission from the gain element 1012 modulated by data of the pumping light from the ONU. Accordingly, using the upstream/downstream WDM 1014 enables a single bi-directional fibre to be used between the ONU and the arrangement 1000. In the embodiment shown in FIG. 10, the data modulated downstream signal is at 1550 nm, the data modulated pumping light is at 1300 nm, and the data modulated transmission light is at 1550 nm.

Although in this embodiment the AWG 1010 and the upstream/downstream WDMs 1014 are shown separately, they may be integrated together as a single unit.

If the arrangement 1000 is used as the kerbside unit 708 in the system of FIG. 7 modification is necessary. Rather than routing upstream and downstream data traffic through separate WDMs, both are routed through the AWG. Thus, the arrangement 1000 is relatively compact.

In the case of the embodiments described in relation to FIGS. 7, 8, 9, and 10, the laser cavity includes a wavelength dependent filter which determines the oscillating wavelength of the cavity. Furthermore, a single WDM multiplexer (or AWG) is used as a filter in a laser cavity for each of the optically pumped sources. By placing another reflector, which is common for all the laser cavities, upstream of the WDM (or the AWG), the WDM (or the AWG) simultaneously multiplexes the signals from different users into one fibre in the upstream direction. Because the WDM (or the AWG) determines the oscillating frequency of each laser cavity, automatic frequency (wavelength) synchronization occurs between the laser cavities and the WDM (or the AWG).

It should be noted that in the embodiment described in relation to FIGS. 3 and 6, the WDM performs the functions of demultiplexing the injection light in the downstream direction and multiplexing the data modulated transmission light in the upstream direction.

In external cavity lasers, wavelength selection functions externally with respect to the semiconductor structure. (Although, rough wavelength selection is, of course, also provided by wavelength dependence of gain, but as the gain spectrum is quite broadband (tens of nanometers), the actual selection of lasing wavelength is ruled by the cavity feedback, if this has a more narrow spectral width.) The cavity itself first limits the possibility of lasering into narrow lines, cavity modes, the spectral spacing of which is inversely proportional to the cavity length. In a simple Fabry-Perot semiconductor laser, the spectrum consists of several cavity modes, the total spectral width and number of laser modes depending on the gain spectrum. External cavity structures have usually long cavities, so spacing of cavity modes is narrow (but also laser mode linewidths are narrow, being proportional to the inverse square of cavity length). For single-mode operation, most laser cavities (excluding VCSELs) are so long that additional wavelength selectivity is needed. This is achieved by having one or both cavity end mirrors as spectrally narrowband reflectors. Then, only the cavity mode(s) within the narrow reflection bandwidth will be in the laser spectrum. A multiwavelength laser source consists of separate semiconductor gain structures for each wavelength, having a partially common external cavity structure, which selects the wavelength for each gain structure. The last point here is that the wavelength-selective mirror is only partially reflective—the light transmitted by the mirror is coupled to the output that is common to all wavelengths, the multiwavelength output. An AWG device can be used as such a wavelength selective external cavity common to many wavelengths.

There are a number of alternative gain elements which can be used in the optically pumped source:

1) An optically pumped vertical cavity surface emitting laser (VCSEL) coupled to a single mode fibre. Such a VCSEL is disclosed in Keating, A.; Black, A.; Karim, A.; Yi-Jen Chiu; Abraham, P.; Hu, E.; Bowers, J. "High-temperature optically pumped 1.55 µm VCSEL operating at 6 Gb/s", IEEE Photonics Technology Letters, volume 12, issue 2, February 2000, pages: 116 to 118. Although it is typical for only 20% of pump emission to be absorbed by a VCSEL, about 150 mW pump power can be obtained by using a low-power booster erbium doped fibre amplifier (EDFA) for an LED source in the ONUs.

2) An optically pumped semiconductor laser coupled to a single mode fibre. Optical pumping can be assumed for known multiwavelength semiconductor laser sources. Of course, VCSELs have the advantage of good coupling of pump into the laser (although a substantial part of power is transmitted or reflected, so the longer laser cavity of non-VCSEL might be better). A preferred multiwavelength laser source would have similar wavelength drift due to temperature shift for all channels, see for example:

Zirngibl, M. "Multifrequency lasers and applications in WDM networks", IEEE Communications Magazine, volume 36, issue: 12, December 1998, pages 39 to 41.

Bewley, W. W.; Felix, C. L.; Vurgaftman, I.; Meyer, J. R.; Xu, G.; Shi, Z.; Moller, L.; Doerr, C. R.; Joyner, C. H.; Zirngibl, M, "Multifrequency laser based on integrated Vernier-cavity for mode stabilisation", Electronics Letters, volume 36, issue 6, 16 Mar. 2000, pages 540 to 542.

3) A single mode pumped fibre laser coupled to single mode fibre. Since a long fibre laser is limited in modulation speed, an array of waveguide lasers would be suitable. Typical rare-earth doped materials have relatively long excited-state lifetimes, so semiconductor devices would be suitable.

4) A cladding pumped fibre laser coupled to a multi mode fibre. An advantage of such an optically pumped source is that it permits multi mode fibre (even Plastic Optical Fiber) between the kerbside unit and the ONUs. A dual-waveguide semiconductor structure may be used so long as it is provided with a sufficiently transparent cladding waveguide at the pumping wavelength.

In one embodiment of the invention, pumping light is reflected at the ONUs rather than being generated at the ONUs. In this embodiment, the function of the ONUs would be to modulate the reflected light.

Therefore, as can be seen from the numerous embodiments described in the foregoing, according to the invention, the hub controls multiplexing and wavelength conversion.

It should be noted that the invention particularly concerns the implementation of optical components for transmission in the upstream direction. WDMA transmission in the downstream direction can use known technology. In FIGS. 6 and 10 transmission in the downstream direction is also described using the same components as upstream. The skilled person should understand that, in the foregoing, where transmission in the downstream direction has not been shown and/or described, any known means can be used to achieve it.

Although in the foregoing, the description has referred to WDM being used to route light between the kerbside unit and the ONUs, the invention is not restricted solely to WDM being used. In one embodiment there is both WDM and time division multiplexing. In this embodiment there are several time-division multiplexed ONUs using one WDM channel. Taking FIG. 6 as an example, an optical splitter (for example a 1 to 4 splitter connected to four ONUs 604) is located between the kerbside unit 608 and several ONUs 604. 1.3 µm signals from ONUs are time-division multiplexed, and forwarded to the LC 612.

Particular implementations and embodiments of the invention have been described. It is clear to a person skilled in the art that the invention is not restricted to details of the embodiments presented above, but that it can be implemented in other embodiments using equivalent means without deviating from the characteristics of the invention. The scope of the invention is only restricted by the attached patent claims.

The invention claimed is:

1. An optical data transmission system, comprising:
a hub;
a passive kerb location having an optical router and a plurality of optically pumped sources; and
a plurality of optical network units each corresponding to one of the plurality of optically pumped sources, wherein each optical network unit has a laser for producing data modulated pumping light for transmission to its respective optically pumped source,
wherein each optically pumped source is configured to receive injection light from an injection source outside the passive kerb location and to receive the data modulated pumping light from its respective optical network unit, wherein the optically pumped source is configured to form data modulated transmission light at a predefined wavelength range assigned to its respective optical network unit, wherein the data modulated transmission light is based on the injection light and the data modulated pumping light, and wherein each predefined wavelength range corresponds to a distinct wavelength channel,
wherein the optical router comprises a plurality of upstream/downstream wavelength division multiplexers (WDMs) configured to route different data modulated pumping light to different optically pumped sources and to route the data modulated transmission light to a multiplexing element.

2. An optical data transmission system according to claim 1, wherein the data modulated pumping light is within a wavelength range which does not include the wavelength or wavelengths of the wavelength channels.

3. An optical data transmission system according to claim 1, wherein respective ones of the optical network units are sufficiently similar so that they are interchangeable.

4. An optical data transmission system according to claim 1, wherein the optically pumped sources are injection locked lasers configured to receive injection light, and wherein the injection source of the injection light is upstream from the passive kerb location.

5. An optical data transmission system according to claim 4, wherein an injection wavelength is selected by at least one of a wavelength division multiplexer or an arrayed waveguide grating.

6. An optical data transmission system according to claim 4, wherein the injection light is amplified spontaneous emission noise produced by an upstream preamplifier.

7. An optical data transmission system according to claim 1, wherein the optically pumped sources comprise external cavity lasers.

8. An optical data transmission system according to claim 7, wherein the optical router is within a laser cavity of at least one optically pumped source.

9. An optical data transmission system according to claim 7, wherein the external cavity lasers are formed from narrow band reflectors.

10. An optical data transmission system according to claim 1, wherein the data modulated pumping light is at a wavelength different from the wavelength of light used to carry data traffic upstream from the passive kerb location and downstream from the hub.

11. An optical data transmission system according to claim 1, wherein the multiplexing element comprises an arrayed wavelength grating.

12. The optical data transmission system according to claim 1, wherein the optically pumped sources each comprise:
 a laser cavity;
 one or more mirrors defining the cavity; and
 wavelength selective elements inside the cavity.

13. The optical data transmission system of claim 1, wherein the injection light is split into injection light having different wavelengths, and wherein the plurality of upstream/downstream WDMs are further configured to route the injection light having different wavelengths to different optically pumped sources.

14. A method of optically transmitting data, the method comprising:
 receiving data modulated pumping light from a plurality of optical network units and receiving injection light from an injection source at a passive kerb location in an optical data transmission system, wherein the passive kerb location comprises a plurality of upstream/downstream wavelength division multiplexers (WDMs) and a plurality of optically pumped sources each assigned to a respective optical network unit, wherein each optically pumped source includes a laser cavity configured to select a distinct resonance peak of an incident light, and wherein the optically pumped sources are configured to form data modulated transmission light based on the injection light and the data modulated pumping light;
 passively converting the data modulated pumping light from each optical network unit into data modulated transmission light based on the injection light and the data modulated pumping light, wherein each optical network unit is assigned a distinct predefined wavelength range for its data modulated transmission light corresponding to a distinct wavelength channel, and wherein said converting is performed without an intermediate conversion to or from an electrical signal;
 routing the data modulated pumping light to the plurality of optically pumped sources via the plurality of upstream/downstream WDMs; and
 routing the data modulated transmission light to a multiplexing element via the plurality of upstream/downstream WDMs.

15. The method of transmitting data according to claim 14, further comprising optically pumping, at the passive kerb location, the plurality of optically pumped sources with the plurality of respective data modulated pumping light.

16. The method of transmitting data according to claim 14, wherein the data modulated pumping light is within a wavelength range which does not include the wavelength or wavelengths of the wavelength channels.

17. An optical data transmission system comprising:
 a hub;
 a kerb location having an optical router and a plurality of optically pumped sources; and
 a plurality of optical network units each corresponding to one of the plurality of optically pumped sources, wherein each optical network unit has a laser for producing data modulated pumping light for transmission to its respective optically pumped source,
 wherein each optically pumped source is configured to receive the data modulated pumping light from its respective optical network unit and to form data modulated transmission light at a predefined wavelength range assigned to its respective optical network unit,
 wherein the data modulated transmission light is based on the data modulated pumping light, and
 wherein the optical router comprises a plurality of upstream/downstream wavelength division multiplexers (WDMs) configured to route the data modulated transmission light to a multiplexing element and route the data modulated pumping light to the plurality of optically pumped sources.

18. The optical data transmission system of claim 17, wherein each predefined wavelength range corresponds to a distinct wavelength channel.

19. The optical data transmission system of claim 17, wherein the kerb location is a passive kerb location.

20. The optical data transmission system of claim 17, wherein the data modulated pumping light received at each optically pumped source is within a wavelength range which does not include wavelengths of the wavelength channels.

21. The optical data transmission system of claim 17, wherein the optically pumped sources comprise external cavity lasers.

22. The optical data transmission system of claim 21, wherein the optical router is within a laser cavity of at least one optically pumped source.

23. The optical data transmission system of claim 17, wherein the data modulated pumping light is at a wavelength different from a wavelength of light used to carry data traffic upstream from the kerb location and downstream from the hub.

24. The optical data transmission system of claim 17, wherein the multiplexing element comprises an arrayed wavelength grating.

25. A method of optically transmitting data, the method comprising:
 receiving data modulated pumping light from a plurality of optical network units at a kerb location in an optical data transmission system, wherein the kerb location comprises a plurality of upstream/downstream wavelength division multiplexers (WDMs) and a plurality of optically pumped sources each assigned to a respective optical network unit, and wherein the optically pumped sources are configured to form data modulated transmission light based on the data modulated pumping light;
 passively converting the data modulated pumping light from each optical network unit into data modulated transmission light, wherein each optical network unit is assigned a distinct predefined wavelength range for its data modulated transmission light corresponding to a distinct wavelength channel;
 routing the data modulated pumping light to the plurality of optically pumped sources via the plurality of upstream/downstream WDMs; and routing the data modulated transmission light to a multiplexing element via the plurality of upstream/downstream WDMs.

26. The method of claim 25, wherein each optically pumped source includes a laser cavity configured to select a distinct resonance peak of an incident light.

27. The method of claim 25, wherein said passively converting the data modulated pumping light is performed without an intermediate conversion to or from an electrical signal.

28. The method of claim 25, further comprising optically pumping, at the passive kerb location, the plurality of optically pumped sources with respective data modulated pumping light.

29. The method of claim 25, wherein the data modulated pumping light is within a wavelength range that does not include wavelengths of the respective distinct wavelength channels.

30. The method of claim 25, wherein the kerb location is a passive kerb location.

31. The method of claim 25, wherein the data modulated pumping light is at a wavelength different from a wavelength of light used to carry data traffic upstream from the kerb location and downstream from the hub.

* * * * *

UNITED STATES PATENT AND TRADEMARK OFFICE
CERTIFICATE OF CORRECTION

PATENT NO. : 7,978,976 B2  Page 1 of 1
APPLICATION NO. : 10/622113
DATED : July 12, 2011
INVENTOR(S) : Pohjola et al.

It is certified that error appears in the above-identified patent and that said Letters Patent is hereby corrected as shown below:

Title page, item (57), under "Abstract", in Column 2, Line 2, delete "curb" and insert -- kerb --.

Title page, item (57), under "Abstract", in Column 2, Line 5, delete "curb" and insert -- kerb --.

Page 2, item (56), under "Other Publications", in Column 2, Line 5, delete "pumpled, 1.55 mm" and insert -- pumped, 1.55 µm --.

Signed and Sealed this
Twenty-second Day of November, 2011

David J. Kappos
*Director of the United States Patent and Trademark Office*